US012498351B2

(12) United States Patent
Covey et al.

(10) Patent No.: US 12,498,351 B2
(45) Date of Patent: Dec. 16, 2025

(54) SYSTEMS AND METHODS FOR CONTROLLING TEMPERATURE GRADIENT ALONG A DIFFERENTIAL MOBILITY SPECTROMETER

(71) Applicant: DH Technologies Development Pte. Ltd., Singapore (SG)

(72) Inventors: Thomas R. Covey, Newmarket (CA); Yang Kang, Richmond Hill (CA); Bradley B. Schneider, Bradford (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 526 days.

(21) Appl. No.: 17/918,521

(22) PCT Filed: Apr. 13, 2021

(86) PCT No.: PCT/IB2021/053055
§ 371 (c)(1),
(2) Date: Oct. 12, 2022

(87) PCT Pub. No.: WO2021/209905
PCT Pub. Date: Oct. 21, 2021

(65) Prior Publication Data
US 2023/0176010 A1 Jun. 8, 2023

Related U.S. Application Data

(60) Provisional application No. 63/008,883, filed on Apr. 13, 2020.

(51) Int. Cl.
*G01N 27/624* (2021.01)
*G01N 27/623* (2021.01)
*H01J 49/24* (2006.01)

(52) U.S. Cl.
CPC ......... *G01N 27/624* (2013.01); *G01N 27/623* (2021.01); *H01J 49/24* (2013.01)

(58) Field of Classification Search
CPC .. H01J 49/00; H01J 49/02; H01J 49/24; H01J 49/004; H01J 49/0027; H01J 49/0031;
(Continued)

(56) References Cited

U.S. PATENT DOCUMENTS

| 2004/0094706 A1* | 5/2004 | Covey | H01J 49/04 250/288 |
| 2005/0035287 A1* | 2/2005 | Jolliffe | H01J 49/26 250/288 |

(Continued)

FOREIGN PATENT DOCUMENTS

| WO | 2012047465 A1 | 4/2012 |
| WO | 2012167254 A1 | 12/2012 |

OTHER PUBLICATIONS

International Search Report and Written Opinion for PCT/IB2021/053055 mailed Jul. 19, 2021.
(Continued)

*Primary Examiner* — Jason L McCormack
(74) *Attorney, Agent, or Firm* — Potomac Law Group, PLLC; Reza Mollaaghababa; Ido Rabinovitch

(57) ABSTRACT

A system and method are provided for controlling the temperature gradient along a differential mobility spectrometer having a differential mobility spectrometer having an inlet and an outlet, wherein the inlet is configured to receive ions transported from an ion source by a transport gas. The differential mobility spectrometer has an internal operating pressure, electrodes, and at least one voltage source for providing DC and RF voltages to the electrodes for separating ions that are transported from the inlet to the outlet. A gas port is provided near the outlet for introducing a throttle gas to control the flow rate of the transport gas
(Continued)

through the differential mobility spectrometer and thereby adjust the ion residence time. A heater is provided for controlling the temperature of the throttle gas to minimize the temperature gradient between the inlet and outlet of the differential mobility spectrometer. A method of calibrating a DMS is also disclosed.

17 Claims, 6 Drawing Sheets

(58) Field of Classification Search
CPC ...... H01J 49/005; H01J 49/0422; H01J 49/06; H01J 49/062; H01J 49/063; G01N 27/624; G01N 27/623
USPC .................................................. 250/281, 282
See application file for complete search history.

(56) References Cited

U.S. PATENT DOCUMENTS

| | | | |
|---|---|---|---|
| 2010/0282966 A1* | 11/2010 | Schneider | ............ G01N 27/623 250/282 |
| 2016/0334369 A1* | 11/2016 | Covey | ................. H01J 49/0031 |
| 2017/0082578 A1 | 3/2017 | Kobold et al. | |
| 2018/0372683 A1* | 12/2018 | Hauck | ..................... H01J 49/24 |
| 2020/0139273 A1* | 5/2020 | Badiei | ....................... B03C 3/08 |

OTHER PUBLICATIONS

Krylov E V et al: "Temperature effects in differential mobility spectrometry", International Journal of Mass Spectrometry, Elsevier Science Publishers, Amsterdam, NL, vol. 279, No. 2-3 Jan. 15, 2009, pp. 119-125.

* cited by examiner

SYSTEMS AND METHODS FOR CONTROLLING TEMPERATURE GRADIENT ALONG A DIFFERENTIAL MOBILITY SPECTROMETER

RELATED APPLICATION

This application claims priority to U.S. provisional application No. 63/088,883 filed Apr. 13, 2020 the content of which is incorporated herein by reference in its entirety.

FIELD

The present invention is directed to differential mobility spectrometers, and more particularly to systems and methods for controlling the temperature between the inlet and outlet of a differential mobility spectrometer using heated throttle gas.

BACKGROUND

Differential Mobility Spectrometry (DMS), also referred to as high field-asymmetric waveform ion mobility spectrometry (FAIMS) or field ion spectrometry (FIS), separates and analyzes ions based on the field dependence of ion mobility. In DMS, ions are transferred between a pair of electrodes in a DMS cell with the use of transport gas flow and an asymmetric RF separation waveform is applied perpendicular to the direction of the transport gas flow between the electrodes. The amplitude of the waveform is referred to as the separation voltage (SV). Differences in ion mobility in high field and low field over each period of the waveform cause ions to be displaced towards the electrodes. To correct the tilt in ion trajectory and transfer ions through the electrodes, a weak DC potential often referred to as a compensation voltage (CoV) is used. For a particular ion, values of CoV change as SV varies. The CoV can be fixed to a target value to allow one specific ion beam to pass through the DMS at a fixed SV; or the CoV can be ramped to sequentially allow ions within a defined CoV range to pass through the DMS.

A throttle gas may be introduced proximate the outlet of the differential mobility spectrometer for modifying the flow rate of the transport gas to control the residence time of the ions within the differential mobility spectrometer, as described in U.S. Pat. No. 8,084,736 (Schneider et al.), the contents of which are incorporated herein by reference. Ion residence time is a key determinant of DMS resolution which can be characterized by the full width half maximum (FWHM) of peaks in an ionogram generated by ramping CoV in a defined range at a fixed SV. With other factors such as mobility coefficient and gap height fixed, increasing the ion residence time provides narrower ionogram peak widths and thus improves the DMS resolution.

The SV and CoV potentials give rise to RF and DC electric fields within the differential mobility spectrometer, as discussed above, that may be represented by gas-number density-normalized values (E/N), where N is the gas number density representing the number of gas molecules in a given volume. A constant E/N ratio (referred to as a homogeneous field) along the length of the DMS electrodes ensures optimal ion separation. Since the electric field strength (E) at any distance from either electrode remains substantially constant along the length of the differential mobility spectrometer, the gas number density (N) must also therefore be maintained substantially constant, which requires minimizing the temperature gradient along the length of the DMS electrodes.

A differential mobility spectrometer may be coupled to the inlet orifice of a mass spectrometer to supply at least a portion of the separated ions thereto for qualitative and/or quantitative analysis of compounds and isobaric species of interest. High-sensitivity mass spectrometers can have large inlet orifice aperture sizes between atmosphere and the first vacuum stage and can draw large volumes of gas during operation. Prior art approaches for adjustable resolution can include providing additional gas flows at the back of the DMS cell, and this can lead to thermal instability in the coupled differential mobility spectrometer due to cooling of the transport gas or throttle gas. This cause the gas number density (N) along the length of the DMS electrodes to vary to a substantial extent. As discussed above, such temperature gradients are known to be detrimental, particularly when a differential mobility spectrometer is run with chemical modifiers.

SUMMARY

It is an aspect of the present invention to provide systems and methods for controlling the temperature between the inlet and outlet of a differential mobility spectrometer, and thereby the temperature gradient, using heated throttle gas.

In an aspect, there is provided a mass spectrometer system comprising: a differential mobility spectrometer for receiving ions from an ion source, the differential mobility spectrometer having an internal operating pressure, electrodes, and at least one voltage source for providing DC and RF voltages to the electrodes; a mass spectrometer at least partially sealed to, and in fluid communication with, the differential mobility spectrometer for receiving the ions from the differential mobility spectrometer; a vacuum chamber surrounding the mass spectrometer for maintaining the mass spectrometer at a vacuum pressure lower than the internal operating pressure, the vacuum chamber having a vacuum chamber inlet and being operable to draw a gas flow including the ions through the differential mobility spectrometer and into the vacuum chamber via the vacuum chamber inlet; a gas port for modifying a gas flow rate through the differential mobility spectrometer, the gas port being located between the differential mobility spectrometer and the mass spectrometer; and a heater for controlling the temperature of gas flow from the gas port.

In some embodiments, the heater controls the temperature of gas flow from the gas port to be approximately the same as the temperature of gas flow through the differential mobility spectrometer.

In some embodiments, the mass spectrometer system further comprises a controller for sensing the temperature of gas flow at opposite ends of the differential mobility spectrometer and adjusting the temperature of gas flow from the gas port so that the temperature of gas flow at said opposite ends is approximately the same.

In some embodiments, the mass spectrometer system further comprises a controller for sensing the temperature of gas flow from the gas port and temperature of gas flow through the differential mobility spectrometer and adjusting the temperature of gas flow from the gas port to be approximately the same as the temperature of gas flow through the differential mobility spectrometer.

In another aspect, a mass spectrometer system is provided comprising: a differential mobility spectrometer having an inlet and an outlet, wherein the inlet is configured to receive ions transported from an ion source by a transport gas, the differential mobility spectrometer having an internal operating pressure, electrodes, and at least one voltage source for providing DC and RF voltages to the electrodes for separating ions that are transported from the inlet to the outlet; a gas port proximate the outlet for introducing a throttle gas to control the flow rate of the transport gas through the differential mobility spectrometer; and a heater for controlling the temperature of the throttle gas to minimize temperature gradient between the inlet and outlet of the differential mobility spectrometer.

In some embodiments, the heater controls the temperature of throttle gas flow from the gas port to be approximately the same as the temperature of the transport gas flow at a pre-determined location in the differential mobility spectrometer.

In some embodiments, the pre-determined location is at the inlet of the differential mobility spectrometer.

In some embodiments, the mass spectrometer system further comprises a controller for sensing the temperature of gas flow proximate to at least one of the inlet and outlet of the differential mobility spectrometer and adjusting the temperature of the throttle gas flow to normalize temperature difference between the inlet and outlet of the differential mobility spectrometer.

In some embodiments, the controller includes at least one regulator for controlling flow of said transport gas and throttle gas, and at least one heater power controller for controlling temperature of said transport gas and throttle gas.

In some embodiments, the mass spectrometer system further comprises a gas line for conveying the throttle gas to the gas port and a jacket liner surrounding the gas line, and wherein the heater comprises an in-line heating element within the jacket liner.

In an aspect, a method is provided of operating a differential mobility spectrometer having an inlet and an outlet, comprising: receiving ions from an ion source by a transport gas; conveying the ions from the inlet to the outlet of the differential mobility spectrometer; providing DC and RF electric fields within the differential mobility spectrometer for separating the ions based on mobility as they are transported from the inlet to the outlet; introducing a throttle gas to control the flow rate of the transport gas through the differential mobility spectrometer; and controlling the temperature of the throttle gas to minimize temperature gradient between the inlet and outlet of the differential mobility spectrometer.

In some embodiments, the temperature of throttle gas is controlled at the outlet of the differential mobility spectrometer to be approximately the same as the temperature of the transport gas at a pre-determined location within the differential mobility spectrometer.

In some embodiments, the pre-determined location is proximate the inlet of the differential mobility spectrometer.

In some embodiments, the temperature of gas at the inlet and outlet of the differential mobility spectrometer is controlled to be in the range of 75° to 300° C.

In some embodiments, the temperature of the throttle gas is controlled to be approximately 100-200° C.

In some embodiments, the method further comprises sensing the temperature of gas flow proximate to at least one of the inlet and outlet of the differential mobility spectrometer and adjusting the temperature of the throttle gas flow to normalize temperature difference between the inlet and outlet of the differential mobility spectrometer.

In some embodiments, the method further comprises regulating flow of said transport gas and throttle gas.

In some embodiments, the method further comprises controlling temperature of said transport gas.

In an aspect, a method is provided for calibrating a differential mobility spectrometer having an inlet and an outlet, comprising: receiving ions from an ion source by a transport gas; conveying the ions from the inlet to the outlet of the differential mobility spectrometer; providing DC and RF electric fields within the differential mobility spectrometer for separating the ions based on mobility as they are transported from the inlet to the outlet; detecting a first value of field-dependent mobility of the ions; introducing a throttle gas to control the flow rate of the transport gas through the differential mobility spectrometer; and detecting a second value of field-dependent mobility of the ions after introduction of the throttle gas; and controlling the heat of the throttle gas until the second value is equal to the first value.

In an embodiment, the detecting the second value of field-dependent mobility of the ions comprises observing peak CoV shift while increasing the throttle gas flow, and automatically adjusting the temperature of the throttle gas until peak CoV after introduction of the throttle gas becomes identical to peak CoV when no throttle gas is applied.

In an embodiment, the method further comprises automatic control of throttle gas heating until optimal peak height and peak width are achieved, indicative of minimized temperature gradient along the length of differential mobility spectrometer, thereby enabling automatic tuning in DMS resolution optimization.

In an aspect a mass spectrometer system is provided comprising: a differential mobility spectrometer having an inlet and an outlet, wherein the inlet is configured to receive ions transported from an ion source by a transport gas, the differential mobility spectrometer having an internal operating pressure, electrodes, and at least one voltage source for providing DC and RF voltages to the electrodes for separating ions that are transported from the inlet to the outlet; a mass spectrometer at least partially sealed to, and in fluid communication with, the differential mobility spectrometer for receiving the ions from the differential mobility spectrometer; a vacuum chamber for maintaining the mass spectrometer at a vacuum pressure lower than the internal operating pressure of the differential mobility spectrometer, the vacuum chamber having a vacuum chamber inlet and being operable to draw a gas flow including the ions from the inlet to the outlet of the differential mobility spectrometer and into the vacuum chamber via the vacuum chamber inlet; a gas port proximate the outlet of the differential mobility spectrometer for introducing a throttle gas to control the flow rate of the transport gas through the differential mobility spectrometer; and a heater for controlling the temperature of the throttle gas to minimize temperature gradient between the inlet and outlet of the differential mobility spectrometer.

In an embodiment, the heater controls the temperature of throttle gas flow from the gas port to be approximately the same as the temperature of the transport gas flow at a pre-determined location in the differential mobility spectrometer.

In an embodiment, the pre-determined location is at the inlet of the differential mobility spectrometer.

In an embodiment, the mass spectrometer system further comprises a controller for sensing the temperature of gas flow proximate to at least one of the inlet and outlet of the differential mobility spectrometer and adjusting the temperature of the throttle gas flow to normalize temperature difference between the inlet and outlet of the differential mobility spectrometer.

In an embodiment, the controller includes at least one regulator for controlling flow of said transport gas and throttle gas, and at least one heater power controller for controlling temperature of said transport gas and throttle gas.

In an embodiment, the mass spectrometer system further comprises a gas line for conveying the throttle gas to the gas port and a jacket liner surrounding the gas line, and wherein the heater comprises an in-line heating element within the jacket liner.

In various embodiments, any of the mass spectrometer systems according to the present teachings further comprises a curtain plate including an aperture for receiving the ions and defining a curtain chamber containing the differential mobility spectrometer, a curtain gas supply for supplying a curtain gas into the curtain chamber to provide the transport gas flow through the differential mobility spectrometer, and a curtain gas outflow out of the curtain chamber. In various embodiments, the mass spectrometer system further comprises a heat exchanger in the curtain plate for heating the curtain gas. In various embodiments, the heat exchanger is surrounded by ceramic beads through which the curtain gas flows and is heated thereby. In various embodiments, the heater controls the temperature of the throttle gas so that the temperature at the location where the mass spectrometer is at least partially sealed to, and in fluid communication with, the differential mobility spectrometer is in the range of from 75° C. to 300° C.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
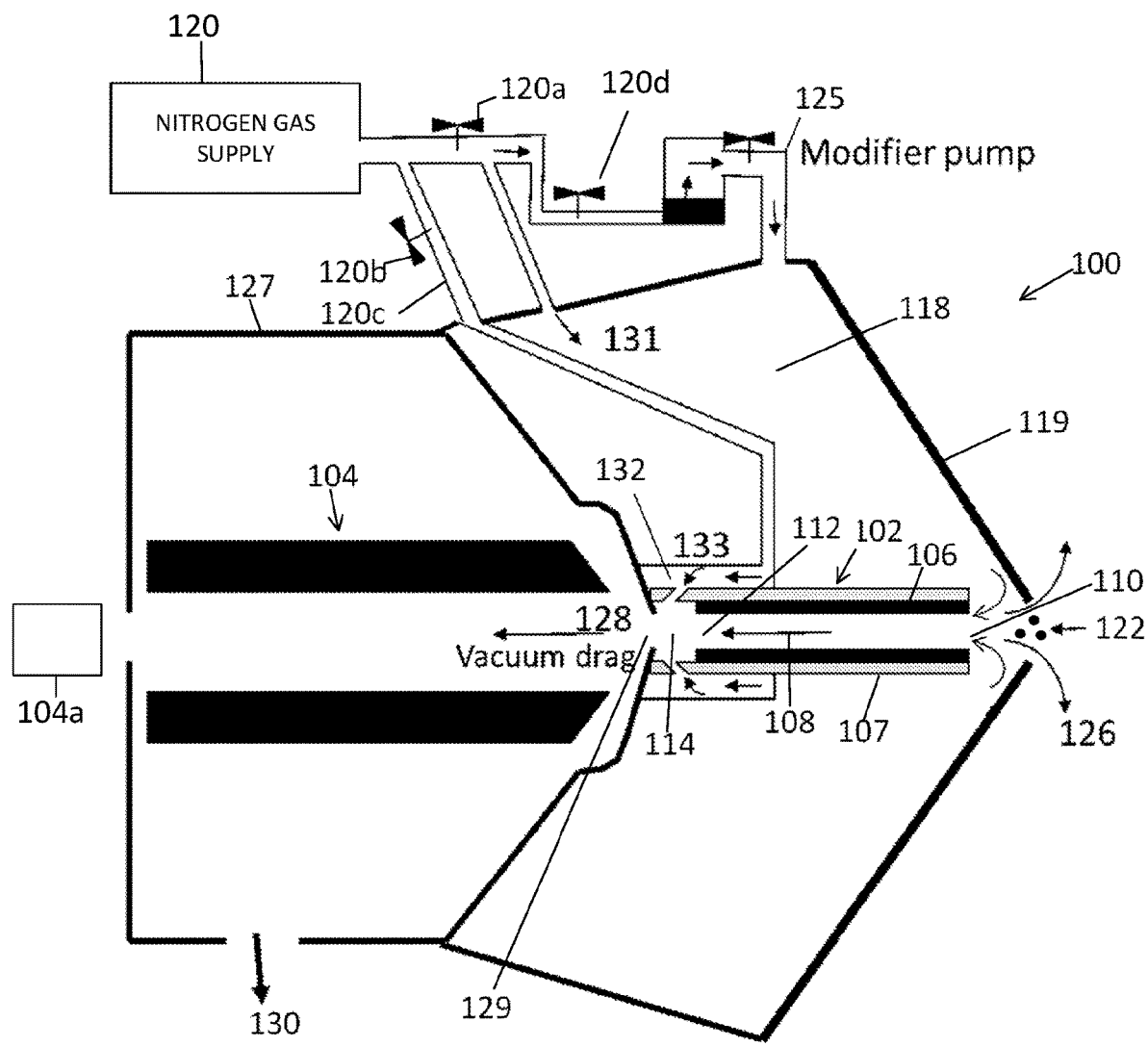
FIG. 1 is a schematic representation of a differential mobility spectrometer/mass spectrometer system.

FIG. 1 shows a differential mobility spectrometer/mass spectrometer system 100, according to an embodiment. The differential mobility spectrometer/mass spectrometer system 100 comprises a differential mobility spectrometer 102 and a first vacuum lens element 104 of a mass spectrometer (hereinafter generally designated mass spectrometer 104). Mass spectrometer 104 also comprises mass analyzer elements 104a downstream from a vacuum chamber 127. Ions can be transported through vacuum chamber 127 as a result of pressure maintained by a vacuum pump 130 and may be transported through one or more additional differentially pumped vacuum stages prior to the mass analyzer elements 104a. For instance, in one embodiment a triple quadrupole mass spectrometer may comprise three differentially pumped vacuum stages. The third vacuum stage may contain a detector, as well as two quadrupole mass analyzers with a collision cell located between them. Alternatively, there may be four or more differentially pumped vacuum stages. It will be apparent to those of skill in the art that there may be other ion optical elements in the system that have not been described. This example is not meant to be limiting as it will also be apparent to those of skill in the art that the differential mobility spectrometer/mass spectrometer coupling described can be applicable to many mass spectrometer systems that sample ions from elevated pressure sources. These may include time of flight (TOF), ion trap, quadrupole, or other mass analyzers as known in the art.

The differential mobility spectrometer 102 comprises plates 106 and an electrical insulator 107 along the outside of plates 106. The plates 106 surround a transport gas 108 that drifts from an inlet orifice 110 to an outlet 112 of the differential mobility spectrometer 102. Insulator 107 supports the electrodes and isolates them from other conductive elements. The outlet 112 of the differential mobility spectrometer 102 releases the transport gas into a juncture chamber 114, which defines a path of travel for ions between the differential mobility spectrometer 102 and the mass spectrometer 104. In some embodiments, the outlet 112 of the differential mobility spectrometer 102 is aligned with the inlet of the mass spectrometer 104 to define the ion path of travel therebetween.

The differential mobility spectrometer 102 and juncture chamber 114 are both contained within a curtain chamber 118, defined by curtain plate (boundary member) 119 and supplied with a curtain gas from a nitrogen gas supply 120. The nitrogen gas supply 120 provides the curtain gas to the interior of the curtain chamber 118. Ions 122 are provided from an ion source (not shown) and are emitted into the curtain chamber 118 through an aperture in the curtain plate 119. The pressure of the curtain gas within the curtain chamber 118 provides both a curtain gas outflow 126 out of curtain chamber 118, as well as a transport gas 108 that carries the ions 122 through the differential mobility spectrometer 102 and into the juncture chamber 114. The curtain plate 119 may be connected to a power supply to provide an adjustable DC potential to it.

As illustrated in FIG. 1, first vacuum lens element 104 of the mass spectrometer is contained within a vacuum chamber 127, which can be maintained at a much lower pressure than the curtain chamber 118 by means of vacuum pump 130. As a result of the significant pressure differential between the curtain chamber 118 and the vacuum chamber 127, the transport gas 108 is drawn through the differential mobility spectrometer 102, the juncture chamber 114 and, via vacuum chamber inlet 129, into the vacuum chamber 127 and first vacuum lens element 104. As shown, the mass spectrometer 104 can be sealed to (or at least partially sealed), and in fluid communication with the differential mobility spectrometer, via the juncture chamber 114, to receive the ions 122 from the differential mobility spectrometer 102.

As shown, gas ports 132 are provided for admitting the throttle gas into the juncture chamber 114. Within the juncture chamber 114, the nitrogen gas supply provides a throttle gas 133 that throttles back the flow of the transport gas 108 through the differential mobility spectrometer 102. Specifically, the throttle gas flow 133 within the juncture chamber 114 modifies the transport gas 108 flow rate within the differential mobility spectrometer 102 and into the juncture chamber 114, thereby controlling the residence time of the ions 122 within the differential mobility spectrometer 102. By controlling the residence time of the ions 122 within the differential mobility spectrometer 102, resolution and sensitivity can be adjusted. That is, increasing the residence times of the ions 122 within the differential mobility spectrometer 102 can increase the resolution, but can also result in additional losses of the ions, reducing sensitivity detected in a mass spectrometer. In some embodiments it can therefore be desirable to be able to precisely control the amount of throttle gas that is added to the juncture chamber 114 to provide a degree of control to the gas flow rate through the differential mobility spectrometer 102, thereby controlling the tradeoff between sensitivity and selectivity. In the embodiment of FIG. 1, the throttle gas flow 133 can be controlled in a number of ways including a controlled leak size, a pressurized gas line with an adjustable valve, or a series of restrictive aperture to name a few, or any other approaches known in the art.

The gas ports 132 can be oriented to disperse the throttle gas flow 133 throughout the juncture chamber 114. In one embodiment, the gas port 132 introduces the throttle gas without disrupting the gas streamlines between the differential mobility spectrometer 102 and the mass spectrometer inlet 129.

As described above and as known in the art, RF voltages, often referred to as separation voltages (SV), can be applied across an ion transport chamber of a differential mobility spectrometer perpendicular to the direction of transport gas flow 108. The RF voltages may be applied to one or both of the DMS electrodes comprising the differential mobility spectrometer. The tendency of ions to migrate toward the walls and leave the path of the DMS can be corrected by a DC potential often referred to as a compensation voltage (CoV). The compensation voltage may be generated by applying DC potentials to one or both of the DMS electrodes comprising the differential mobility spectrometer. As is known in the art, a DMS voltage source (not shown) can provide both the RF SV and the DC CoV voltages. Alternatively, multiple voltage sources may be provided.

In some embodiments, a single nitrogen gas supply can be used to provide curtain gas and throttle gas flows. In other embodiments, multiple gas supplies can be used. FIG. 1 shows an embodiment with a single nitrogen gas supply 120. Regulators with valves can be used to control the rate of flow of the throttle gas into the juncture chamber 114 via gas line 120c. Nitrogen gas supply 120 provides a flow 131 (referred to as curtain gas flow or total curtain gas flow) via a regulator 120a to the curtain chamber 119. Nitrogen gas supply 120 also flows to a supply 125 of chemical modifier via a regulator 120d in fluid communication with the curtain gas supply for adding a modifier to the total curtain gas flow 131. Flows through the differential mobility spectrometer and the juncture chamber are ultimately drawn into the mass spectrometer orifice inlet 129 by the vacuum maintained in the vacuum chamber 127, represented by curtain inflow 128. Thus, curtain gas outflow 126=(total curtain gas flow 131+ throttle gas flow 133)−curtain gas inflow 128. In some embodiments, the curtain gas flow 131 may be heated, for example using a heat exchanger, discussed in greater detail below.

As discussed above, a high sensitivity mass spectrometer 104 having a large inlet 129 aperture size between atmosphere and the first vacuum stage 127 can draw a large volume of gas during operation. This requires a high throttle gas flow to adjust the peak resolution. Cooling in the transport gas due to non-heated throttle gas can lead to greater thermal gradient particularly at the back end of the DMS and substantial thermal instability in the differential mobility spectrometer 102, notwithstanding the inclusion of a heat exchanger to heat the curtain gas flow 131.

Under typical operating conditions, the curtain gas inflow 128 may be on the order of 16 L/min, the total curtain gas flow 131 may be on the order of 18 L/min, and the throttle gas flow 133 may vary for controlling ion residence time, as discussed above. Thus, the throttle gas flow 133 may, for example, increase from 0 L/min to on the order of 15 L/min when increased resolving power is required. This, in turn increases the curtain gas outflow 126 from about 2 L/min to about 17 L/min, leading to a decrease in signal for ions of interest. To minimize such signal loss, the curtain gas flow 131 can be decreased concurrently with increasing throttle gas flow 133 to maintain a constant outflow 126.

Figure 2:
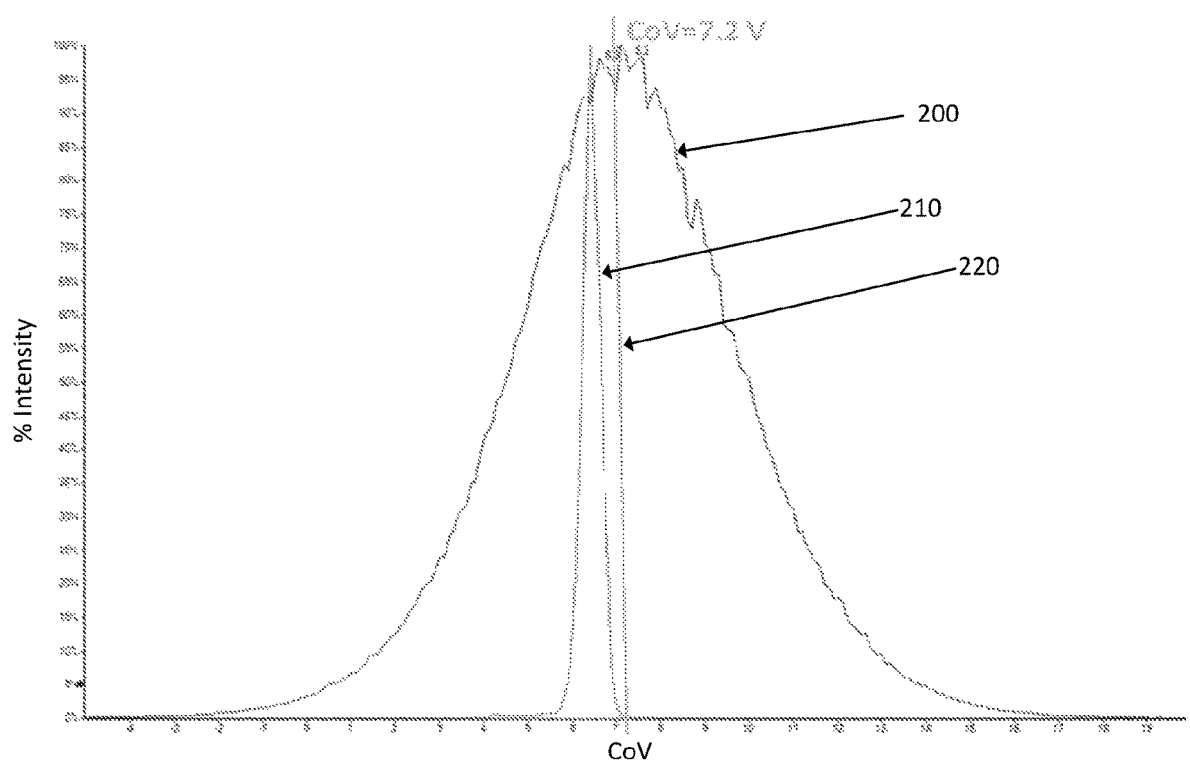
FIG. 2 is an ionogram of a compound analyzed by the differential mobility spectrometer/mass spectrometer system, showing shifts between operation with and without throttle gas flow.

The inventors have discovered that varying the throttle gas flow 133 causes shifts in the DMS ionogram peaks. In particular, when operating differential mobility spectrometer 102 without chemical modifiers, the introduction of cool throttle gas or nitrogen gas into the juncture chamber 114 can cause DMS ionogram peaks to shift to lower CoV values. The use of higher throttle gas flows for achieving higher DMS resolutions accentuates this effect. FIG. 2 is an ionogram of the adrenergic blocking agent reserpine analyzed by the mass spectrometer 104 of FIG. 1, with the throttle gas flow 133 turned off (200) and with the throttle gas flow 133 set to 14 L/min (210). In this example, the curtain gas flow 131 was reduced as the throttle gas flow 133 was increased from 0 to 14 L/min, resulting in a total gas flow (total curtain flow 131+throttle gas flow 133) of 18 L/min with 16 L/min suction flow (curtain gas inflow 128) and 2 L/min (curtain gas outflow 126) counter-flowing out of the curtain plate 119. The vertical line 220 shows the optimum CoV measured with the throttle gas flow 133 turned off. It will be noted that when the throttle gas flow 133 is turned on to 14 L/min, the full width at half maximum (FWHM) measure of DMS resolving power for ionogram 210 decreases to −0.5 V while the CoV shifts lower by ~0.7 V, which is a sufficiently large peak shift as to reduce the measured signal for the compound of interest, reserpine in this example, to 0 counts per second (cps) when the targeted CoV value is fixed during the data acquisition period.

The ~0.7 V peak shift in FIG. 2 results from the cooling effect of introducing non-heated throttle gas. As throttle gas flow 133 increases, the curtain gas flow 131 is reduced by the same amount to maintain the outflow 126 through the curtain plate 119 constant at ~2 L/min. As mentioned above, the curtain gas flow 131 may be heated by a heat exchanger when it passes through the curtain chamber, however for high sensitivity mass spectrometers having large inlet orifice aperture sizes, the throttle gas flow 133 is sufficiently high as to cause significant cooling of the transport gas 108 as it passes through the differential mobility spectrometer 102 particularly at the back end of the DMS, which can lead to a thermal gradient. Such changes in the temperature profile can also affect modifier separations (see Schneider et al., Mass Spec. Rev., 2015). Table 1 shows temperatures measured at the inlet 110 and outlet 112 of an exemplary differential mobility spectrometer 302 (as shown in FIG. 3, and described below) coupled to a high sensitivity mass spectrometer 304 having a large inlet 329 aperture size of I.D.=1.55 mm.

TABLE 1

| Throttle Gas Flow (L/min) | Total Curtain Gas Flow (L/min) | Temperature Measured at DMS Inlet (° C.) | Temperature Measured at DMS Outlet (° C.) | Temperature Difference (Δ inlet − outlet) (° C.) |
| --- | --- | --- | --- | --- |
| 0 | 18.0 | 148.9 | 120.5 | 28.4 |
| 3.6 | 14.4 | 147.5 | 116.7 | 30.8 |
| 5.8 | 12.2 | 146.1 | 113.5 | 32.6 |
| 7.6 | 10.4 | 144.3 | 110.2 | 34.1 |
| 8.6 | 9.4 | 143.4 | 107.9 | 35.5 |

Figure 3:
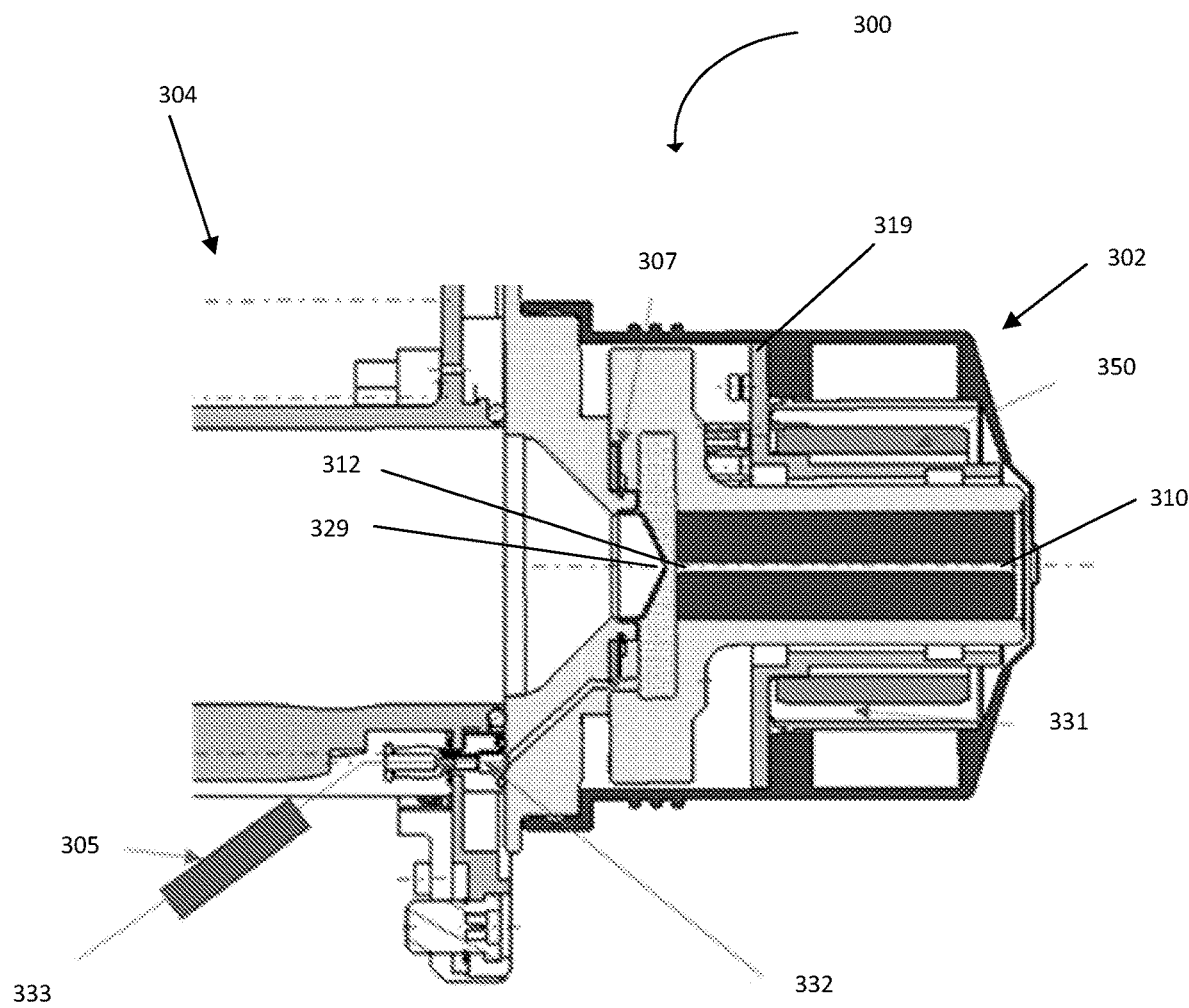
FIG. 3 shows an exemplary differential mobility spectrometer/mass spectrometer system, according to an embodiment.

In the exemplary differential mobility spectrometer/mass spectrometer system 300 of FIG. 3, the cooling effects that occur when introducing the throttle gas to differential mobility spectrometer 302 coupled and sealed to a mass spectrometer 304, are mitigated by providing an orifice heater 307 and a throttle gas heater 305 disposed proximate the outlet 312. The curtain plate 319 can also be provided with a heater exchanger 350. In an embodiment, heater exchanger 350 can be surrounded by ceramic beads. In an embodiment, the curtain gas 331 can be heated as it flows through the heated beads to about 105-200° C., into inlet 310, passing through the differential mobility spectrometer 302 to the outlet 312 and into the via vacuum chamber inlet 329. Throttle gas heater 305 can be a jacket liner surrounding the throttle gas flow 333, wherein the heater comprises an in-line heating element within the jacket liner. In an embodiment, the jacket liner may be fabricated from polytetrafluoroethene. It will be apparent to those of skill in the relevant arts that there are many different approaches that can be used to heat a gas flow in addition to a jacket liner.

Figure 4:
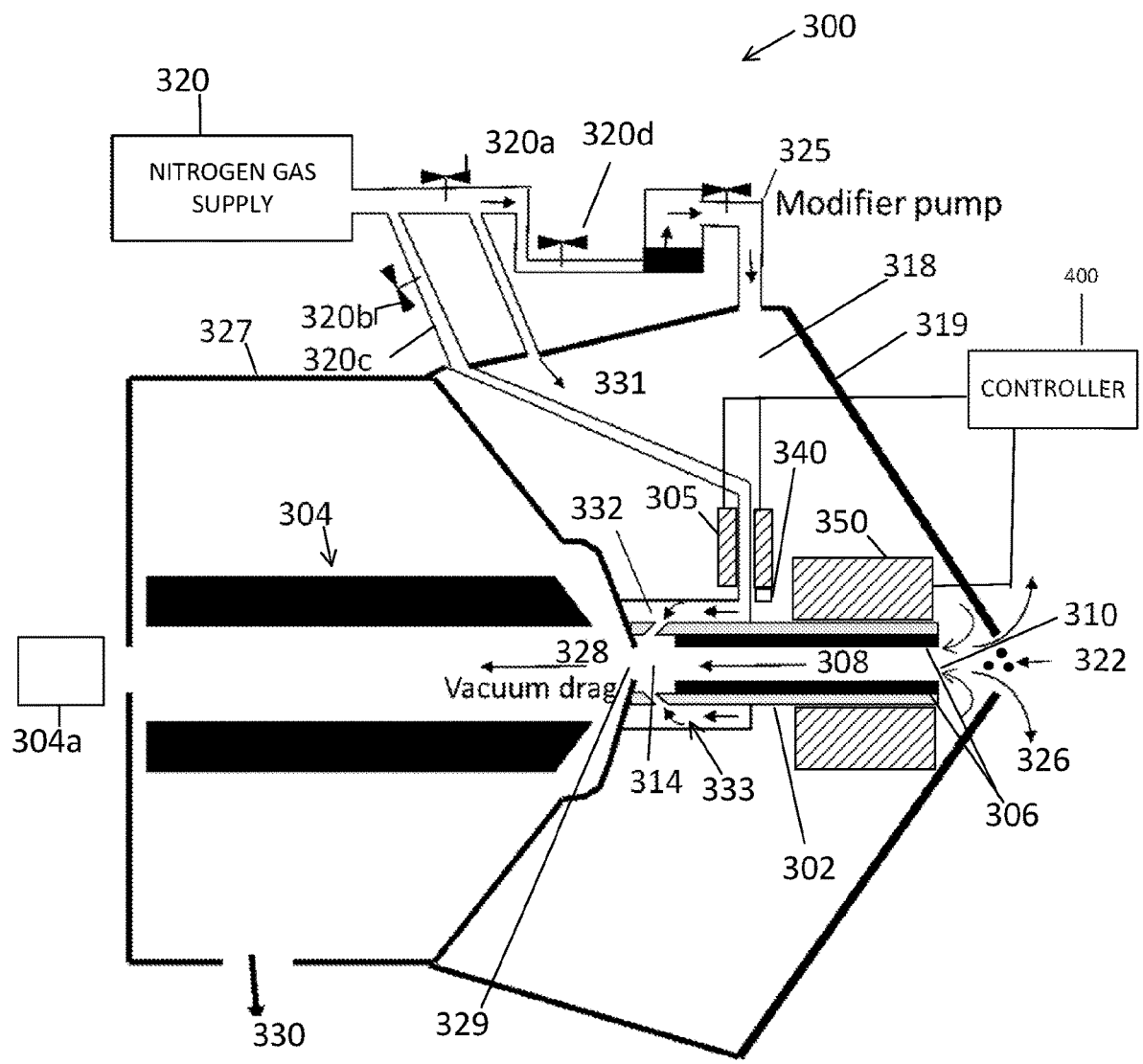
FIG. 4 is a schematic representation of the exemplary differential mobility spectrometer/mass spectrometer system of FIG. 3, adapted for temperature control of at least the throttle gas flow.

FIG. 4 is a schematic representation of the exemplary differential mobility spectrometer/mass spectrometer system of FIG. 3, adapted for temperature control of at least the throttle gas flow 333, according to an embodiment.

In FIGS. 3 and 4, elements that are common to elements appearing in FIG. 1 are identified by similar reference numbers, but with the prefix "3", for example "300" in FIGS. 3 and 4 represents a similar element to "100" in FIG. 1.

Returning to FIG. 4, a controller 400 is shown for controlling throttle gas heater 305 and curtain gas heat exchanger 350 based on temperature inputs from a sensor 340 for measuring temperature of the throttle gas flow 333 and an internal sensor (not shown) within the heat exchanger 350 for measuring the temperature of 331.

The location of sensor 340 can, for example, be placed along the gas line near the line heater adjacent the throttle gas heater 305. Alternatively, the controller 400 may be connected to multiple sensors embedded in a non-conductive DMS holder, such as a ceramic holder.

Controller 400 can also be connected to regulators 320a and 320b for controlling the total curtain gas flow 331 (including any modifier gas) and throttle gas flow 333. The controller 400 can include at least one heater power controller for controlling temperature of said transport gas and throttle gas.

Figure 5:
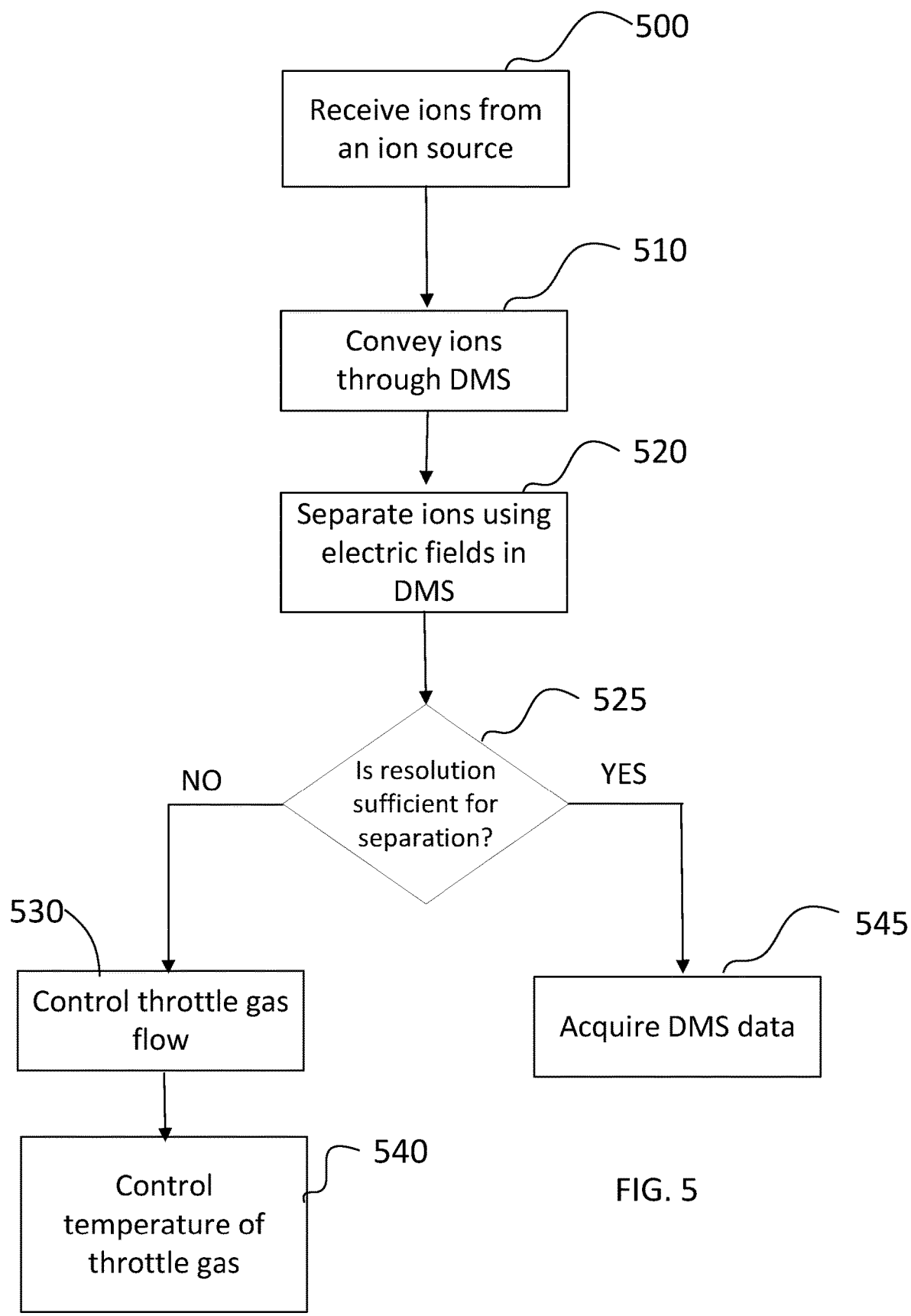
FIG. 5 shows a method of operating a differential mobility spectrometer, according to an embodiment.

The controller 400 may be operable to sense the temperature of gas flow at sensor 340 and adjust the temperature of the throttle gas flow 333 to normalize temperature difference between the inlet 310 and outlet 312 of the differential mobility spectrometer 302, according to the steps in FIG. 5. However, in some embodiments mass spectral data from mass spectrometer 304 may be used as an adjustment parameter, as discussed below, rather than temperature measurement, for example where the location of interest for temperature measurement results in interreference with operation of the sensor 340 due to high electric fields generated between the pair of electrodes 306.

FIG. 5 shows a method of operating a differential mobility spectrometer 302, according to an embodiment. At 500, ions of a sample are received at inlet 310 of the differential mobility spectrometer 302. At 510, the ions are conveyed via the transport gas flow 308 through the differential mobility spectrometer, from inlet 310 to outlet 312. At 520, DC and RF electric fields are generated between a pair of electrodes 306 for separating the ions based on mobility as they are transported from inlet 310 to outlet 312. At step 525, an operator or the controller 400 determines if the resolution is sufficient for DMS separation of molecules. If not, then at step 530, the throttle gas flow 333 is adjusted to control the flow rate of the transport gas through the differential mobility spectrometer 302 and at 540, the temperature of the throttle gas flow 333 is controlled via heater 305 to minimize temperature gradient between the inlet 310 and outlet 312 of the differential mobility spectrometer 302. If, at 525, it is determined that the resolution is sufficient for molecule separation, the DMS data is acquired at step 545.

The throttle gas heater 305 can, for example, be set to provide approximately 100-200° C. throttle gas, so that the temperature of throttle gas flow 333 is approximately the same as the temperature of the transport gas flow 308 at a pre-determined location in the differential mobility spectrometer, such as at inlet 310 or outlet 312. For example, in embodiments, the temperature of gas at the inlet 310 and outlet 312 is controlled to be approximately 105° C. by heating the throttle gas flow 333 to any required temperature, or by adjusting the front heat exchanger and throttle line heater to give similar gas temperatures.

Optionally, the flow of transport gas 308 and throttle gas 333 can be regulated by controller 400 controlling regulators 320a and 320b.

Figure 6:
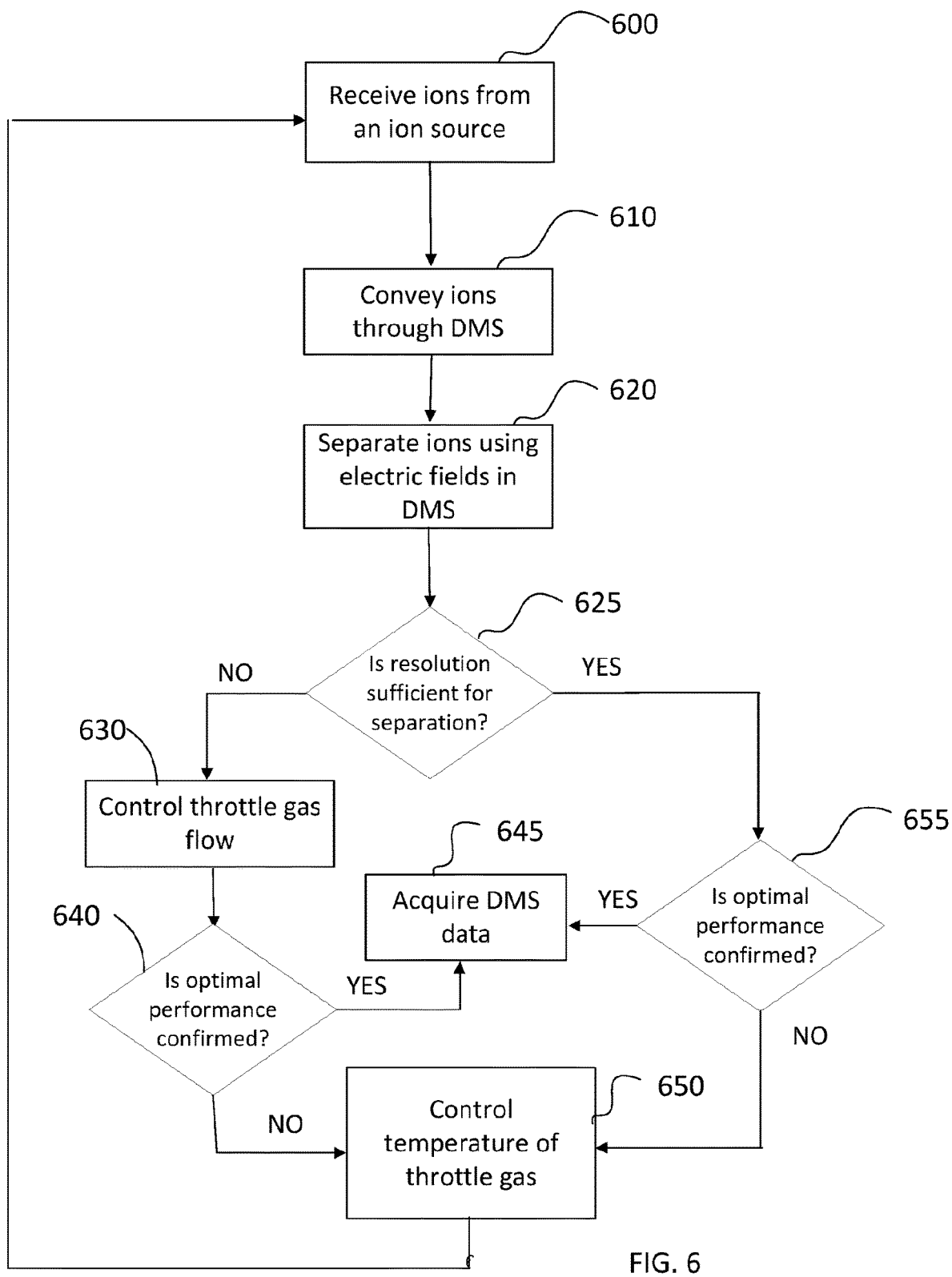
FIG. 6 shows a method of operating or calibrating a differential mobility spectrometer, according to a further embodiment.

FIG. 6 shows a method of operating or calibrating a differential mobility spectrometer 302, according to a further embodiment. At 600, ions of a sample (or a calibrant solution) are received at inlet 310 of the differential mobility spectrometer 302. At 610, the ions are conveyed via the transport gas flow 308 through the differential mobility spectrometer, from inlet 310 to outlet 312. At 620, DC and RF electric fields are generated between a pair of electrodes 306 for separating the ions based on mobility as they are transported from inlet 310 to outlet 312. At step 625, the controller 400 determines if the resolution is sufficient for DMS separation of molecules. If not, then at step 630, the throttle gas flow 333 is adjusted to control the flow rate of the transport gas through the differential mobility spectrometer 302. At 640, the operator or controller 400 determines if the DMS performance is optimal. If yes, then DMS data is acquired at 645. If no, then at 650 the temperature of the throttle gas flow 333 is controlled via heater 305 to minimize temperature gradient between the inlet 310 and outlet 312 of the differential mobility spectrometer 302. If, at 625, the operator or controller 400 determines that the resolution is sufficient for molecule separation, and if, at 655 the operator or controller 400 determines that the DMS performance is optimal, then the DMS data is acquired at step 645. If, at 655, the operator or controller 400 determines that the DMS performance is suboptimal, then the temperature of the throttle gas flow 333 is controlled at 650, until targeted ions give the optimal performance as achieved under conditions with no throttle gas applied (620), after which the process loops back to 600. Optimal performance can be characterized by peak widths, peak height and peak CoV locations.

The calibration method of FIG. 6 can be implemented iteratively, for example by tuning the CoV based on the rate of transport gas flow 308 with no throttle gas applied, observing a signal peak in the mass spectral data provided by the mass spectrometer 304, introducing the throttle gas flow 333 and then adjusting the heater power level to center the peak at the expected COV.

In other embodiments, throttle gas heating may be adjusted to move the peak to a particular location which is consistent with that when no throttle gas is applied. In yet other embodiments, throttle gas heating is adjusted to achieve optimized peak widths particularly when modifier gas is applied and where the temperature gradient has shown a substantial effect on changing the peak widths.

The many features and advantages of the invention are apparent from the detailed specification and, thus, it is intended by the appended claims to cover all such features and advantages of the invention that fall within the scope of the claims. Further, since numerous modifications and changes will readily occur to those skilled in the art, it is not desired to limit the invention to the exact construction and operation illustrated and described, and accordingly all suitable modifications and equivalents may be resorted to, falling within the scope of the claims.

What is claimed is:

1. A mass spectrometer system comprising:
   a differential mobility spectrometer having an inlet and an outlet, wherein the inlet is configured to receive ions transported from an ion source by a transport gas, the differential mobility spectrometer having an internal operating pressure, electrodes, and at least one voltage source for providing DC and RF voltages to the electrodes for separating ions that are transported from the inlet to the outlet;
   a gas port proximate the outlet for introducing a throttle gas to control the flow rate of the transport gas through the differential mobility spectrometer; and
   a heater for controlling the temperature of the throttle gas to minimize, based on temperature of the transport gas, temperature gradient between the inlet and outlet of the differential mobility spectrometer.

2. The mass spectrometer system of claim 1, wherein the heater controls the temperature of throttle gas flow from the gas port to be approximately the same as the temperature of the transport gas flow at a pre-determined location in the differential mobility spectrometer.

3. The mass spectrometer system of claim 2, wherein the pre-determined location is at the inlet of the differential mobility spectrometer.

4. The mass spectrometer system of claim 1, further comprising a controller for sensing the temperature of gas flow proximate to at least one of the inlet and outlet of the differential mobility spectrometer and adjusting the temperature of the throttle gas flow to normalize temperature difference between the inlet and outlet of the differential mobility spectrometer.

5. The mass spectrometer system of claim 4, wherein the controller includes at least one regulator for controlling flow of said transport gas and throttle gas, and at least one heater power controller for controlling temperature of said transport gas and throttle gas.

6. The mass spectrometer system of claim 1, further comprising a gas line for conveying the throttle gas to the gas port and a jacket liner surrounding the gas line, and wherein the heater comprises an in-line heating element within the jacket liner.

7. A method of operating a differential mobility spectrometer having an inlet and an outlet, comprising:
   receiving ions from an ion source by a transport gas;
   conveying the ions from the inlet to the outlet of the differential mobility spectrometer;
   providing DC and RF electric fields within the differential mobility spectrometer for separating the ions based on mobility as they are transported from the inlet to the outlet;
   introducing a throttle gas to control the flow rate of the transport gas through the differential mobility spectrometer; and
   controlling the temperature of the throttle gas to minimize, based on temperature of the transport gas, temperature gradient between the inlet and outlet of the differential mobility spectrometer.

8. The method of claim 7, wherein the temperature of throttle gas is controlled at the outlet of the differential mobility spectrometer to be approximately the same as the temperature of the transport gas at a pre-determined location within the differential mobility spectrometer.

9. The method of claim 8, wherein the pre-determined location is proximate the inlet of the differential mobility spectrometer.

10. The method of claim 7, wherein the temperature of gas at the inlet and outlet of the differential mobility spectrometer is controlled to be in the range of 75° to 300° C.

11. The method of claim 7, wherein the temperature of the throttle gas is controlled to be approximately 100-200° C.

12. The method of claim 7, further comprising sensing the temperature of gas flow proximate to at least one of the inlet and outlet of the differential mobility spectrometer and adjusting the temperature of the throttle gas flow to normalize temperature difference between the inlet and outlet of the differential mobility spectrometer.

13. The method of claim 7, further comprising regulating flow of said transport gas and throttle gas.

14. The method of claim 7, further comprising controlling temperature of said transport gas.

15. The mass spectrometer system of claim 1, further comprising a curtain plate including an aperture for receiving the ions and defining a curtain chamber containing the differential mobility spectrometer, a curtain gas supply for supplying a curtain gas into the curtain chamber to provide the transport gas flow through the differential mobility spectrometer, and a curtain gas outflow out of the curtain chamber.

16. The mass spectrometer system of claim 15, further comprising a heat exchanger in the curtain plate for heating the curtain gas.

17. The mass spectrometer system of claim 16, wherein the heat exchanger is surrounded by ceramic beads through which the curtain gas flows and is heated thereby.

\* \* \* \* \*